United States Patent [19]
Tsukamoto et al.

[11] Patent Number: 5,165,251
[45] Date of Patent: Nov. 24, 1992

[54] COUPLER FOR PIPE OF COOLER UNIT

[75] Inventors: Akira Tsukamoto; Kaoru Ito, both of Tokyo, Japan

[73] Assignee: Calsonic Corporation, Tokyo, Japan

[21] Appl. No.: 683,850

[22] Filed: Apr. 11, 1991

[30] Foreign Application Priority Data

Apr. 17, 1990 [JP] Japan ............................. 2-40800[U]

[51] Int. Cl.[5] .............................................. B60H 1/32
[52] U.S. Cl. ...................................... 62/244; 285/177; 285/192
[58] Field of Search .................. 62/244; 285/177, 192, 285/193

[56] References Cited

U.S. PATENT DOCUMENTS

| 1,026,632 | 5/1912 | Mueller | 285/192 X |
| 1,278,651 | 9/1918 | Heymann | 285/177 |
| 1,357,153 | 10/1920 | Dicken | 285/177 X |
| 1,970,059 | 8/1934 | Schotter | 285/177 X |
| 2,546,348 | 3/1951 | Schuman | 285/177 X |
| 5,056,833 | 10/1991 | Webb et al. | 285/177 |

FOREIGN PATENT DOCUMENTS 63-30210 2/1988 Japan .
2-22486 2/1990 Japan .
2-22487 2/1990 Japan .

Primary Examiner—William E. Tapolcai
Attorney, Agent, or Firm—Foley & Lardner

[57] ABSTRACT

A coupler is disclosed which is constructed of metal. The coupler comprises a cylindrical major part having a first cylindrical bore formed therethrough, the cylindrical major part being formed about its cylindrical outer surface with an externally threaded portion and a polygonal enlarged head; and a collar part having a second cylindrical bore formed therethrough, the second cylindrical bore being greater in diameter than the first cylindrical bore. The cylindrical major part and the collar part are coaxially arranged and integrated with each other to constitute a monobloc cylindrical structure. In practical use, the second cylindrical bore can serve as a silencer.

12 Claims, 2 Drawing Sheets

COUPLER FOR PIPE OF COOLER UNIT

BACKGROUND OF THE INVENTION

1. Field of the Invention

The present invention relates in general to couplers, and more particularly, to couplers for coupling pipes which are used in a cooling system of an automotive air conditioner. More specifically, the present invention is concerned with couplers of a type which couple a coolant pipe from an evaporator of a cooler unit with another pipe which leads to a compressor or condenser.

2. Description of the Prior Art

In order to clarify the task of the present invention, the piping of a cooler unit installed in a conventional automotive air conditioner will be outlined with reference to FIGS. 2 and 3 of the accompanying drawings, which piping is shown in, for example, Japanese Utility Model First Provisional Publication No. 63-30210.

Generally designated by numeral 1 in FIG. 2 is a cooler unit of a conventional automotive air conditioner. The unit 1 comprises an evaporator which cools air supplied thereto and two case parts 2 and 2 which are combined to form a housing in which the evaporator is installed. The case parts 2 and 2 both have an inlet opening 3 to which an air intake unit (not shown) is connected and an outlet opening 4 to which a heater unit (not shown) is connected. The air intake unit is the means through which ambient air and passenger room air are forced to flow, and the heater unit has therein a heater which heats the cooled air from the cooler unit to a desired degree before the air is blown into the passenger room.

Designated by numerals 5a and 5b are inlet and outlet pipes for coolant, which have respective end portions projected into the case parts 2 and fixed to inlet and outlet openings of a coolant passage of the evaporator.

Each pipe 5a or 5b is provided at an outside end with an externally threaded coupler 6 to which a pipe (not shown) leading from a compressor or condenser is connected.

The detailed structure of the externally threaded coupler 6 is shown in FIG. 3. FIG. 3 shows a condition wherein the pipe 5a passes through an opening 12 formed in a dash panel 11 of a motor vehicle. As is known, the dash panel 11 is a member by which an engine room "E" and a passenger room "R" is bordered. In order to stably and sealably hold the pipe 5a in the opening 12 of the dash panel 11, a collar 7 made of aluminium or aluminium alloy is employed, which is intimately and tightly disposed about the pipe 5a. A grommet 13 is further employed, which is fixed to the opening 12 and holds the collar 7 in a manner to achieve a watertight sealing therebetween.

Assembly of the collar 7 and the coupler 6 to the pipe 5a is carried out in the following manner.

First, the collar 7 and the coupler 6, in this order, are loosely received onto the outwardly projected end portion of the pipe 5a. Then, with an aid of a holder (not shown), the collar 7 and the coupler 6 are stationally held keeping contact therebetween. Then, by using a reamer 9 as shown in FIG. 4, the end portion of the pipe 5a is enlarged to such a degree that the outer surface thereof frictionally contacts the inner cylindrical surfaces of the coupler 6 and the collar 7. Then, by using another reamer (not shown), the terminal end of the pipe 5a is further enlarged to such a degree that the outer surface thereof frictionally contacts the inner cylindrical surface of an enlarged part of the bore of the coupler 6. With these steps, the coupler 6 and the collar 7 are fixed to the pipe 5a.

As is shown in FIG. 4, the reamer 9 for enlarging the diameter of the pipe 5a (or 5b) comprises a cylindrical rod part (no numeral) and four axially extending ridges 10. The ridges 10 taper toward one end of the rod part.

The pipe 5a thus equipped with the collar 7 and the coupler 6 is then inserted through the grommet 14 which has been fixed to the opening 12 of the dash panel 11, so that the coupler 6 is exposed to the engine room "E".

The grommet 13 has a labyrinth seal 14 integrally formed thereon, which seal sealingly contacts the outer surface of the collar 7. Because of this labyrinth seal 14, watertight sealing is achieved in the opening 12.

However, due to its inherent construction, the above-mentioned coupling structure has the following drawbacks.

First, the manual labor for enlarging the diameter of the pipe 5a by using the reamer 9 is very troublesome thereby deteriorating the manufacturing efficiency of the air conditioner.

Second, the collar 7 is costly because of the thicker construction of the same.

Third, the outlet pipe 5b tends to emit a rasping noise due to the flow of the coolant therethrough. Although this noise may be eliminated when a silencer is fixed to the pipe 5b, the cost of the cooler unit becomes high.

SUMMARY OF THE INVENTION

It is therefore an object of the present invention to provide means which is free of the above-mentioned drawbacks.

According to a first aspect of the present invention, there is provided a coupler constructed of metal, which comprises a cylindrical major part having a first cylindrical bore formed therethrough, the cylindrical major part being formed about its cylindrical outer surface with an externally threaded portion and a polygonal enlarged head; a collar part having a second cylindrical bore formed therethrough, the second cylindrical bore being greater in diameter than the first cylindrical bore; and means for permitting the second cylindrical bore to serve as a silencer, wherein the cylindrical major part and the collar part are coaxially arranged and integrated with each other to constitute a monobloc cylindrical structure.

According to a second aspect of the present invention, there is provided in a motor vehicle having a cooler unit and a dash panel, an arrangement comprising: means defining an opening in the dash panel; at least one pipe extending from the cooler unit to the opening; a grommet detachably connected to the opening; a coupler constructed of metal, comprising: a cylindrical major part having a first cylindrical bore formed therethrough, the cylindrical major part being formed about its cylindrical outer surface with an externally threaded portion and a polygonal enlarged head; a collar part having a second cylindrical bore formed therethrough, the second cylindrical bore being greater in diameter than the first cylindrical bore; and silencing means for permitting the second cylindrical bore to serve as a silencer, wherein the cylindrical major part and the collar part are coaxially arranged and integrated with each other to constitute a monobloc cylindrical structure, and wherein the coupler is sealingly held by the grommet; and connecting means for connecting a leading end of the pipe with a rear end of the collar part of the coupler.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
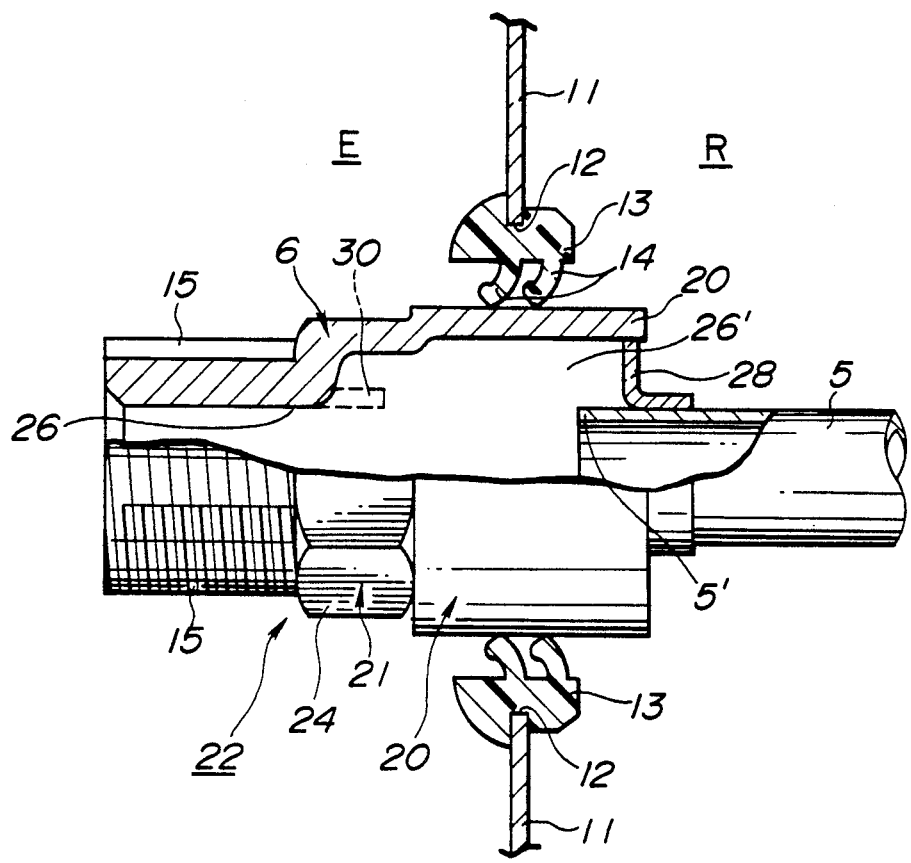
FIG. 1 is a sectional view of an essential part showing an embodiment of the present invention.
Figure 3:
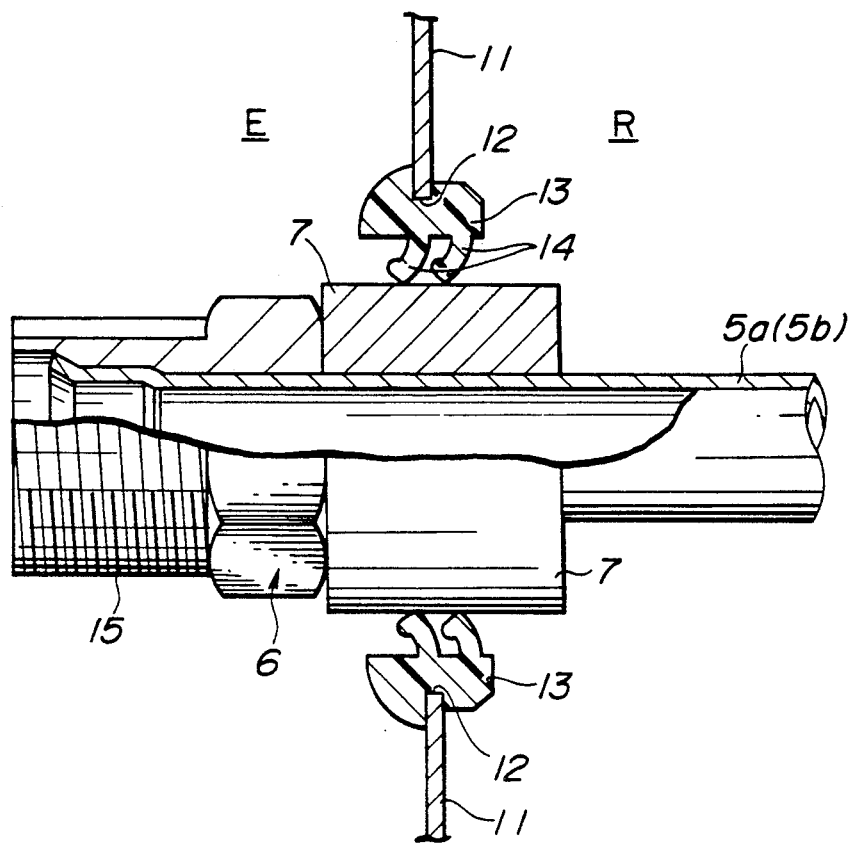
FIG. 3 is a view similar to FIG. 1, but showing a conventional sealing structure.
Figure 4:
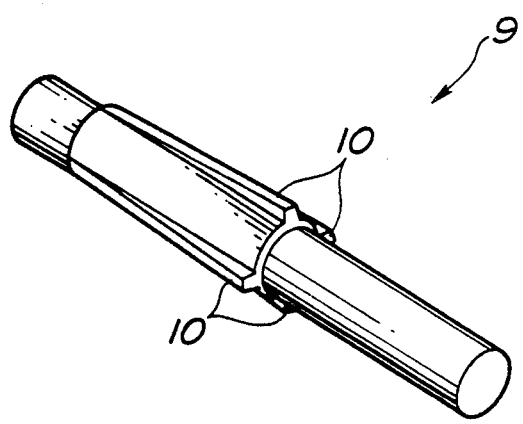
FIG. 4 is a perspective view of a reamer used for reaming a pipe.

Referring to FIG. 1, there is shown an embodiment of the present invention. In the drawing, parts identical to those of the afore-mentioned conventional sealing structure of FIG. 3 are denoted by the same numerals and detailed description of them will be omitted from the following.

Figure 2:
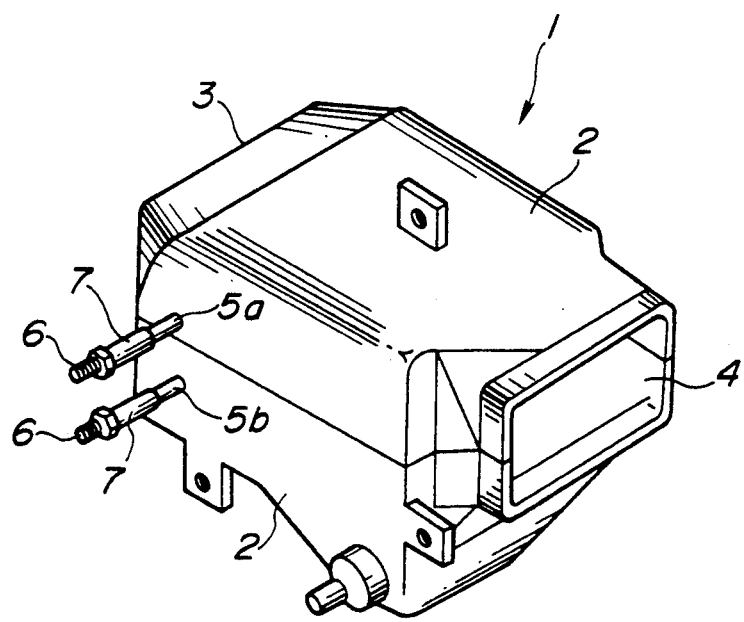
FIG. 2 is a perspective view of a cooler unit for use in an automotive air conditioner.

The pipe 5 shown in FIG. 1 is an outlet pipe which corresponds to the outlet pipe 5b shown in FIG. 2. An inner end of the pipe 5 is connected to the evaporator installed in the housing 2.

To an outer end of the pipe 5, there is connected a coupler 22 which has a unique construction for eliminating the above-mentioned drawbacks of the conventional coupler.

As is seen from FIG. 1, the coupler 22 is of a monobloc metal hollow structure, preferably made of forged aluminium or the like, which has a bore 26 formed therethrough.

The coupler 22 comprises generally a cylindrical major part 21 and a sealing collar part 20 which are coaxially united. The major part 21 is formed about its cylindrical outer surface with external threads 15 and a hexagonal enlarged head 24. To the threaded part 15, there is connected an inwardly threaded end of a pipe (not shown) which extends from a compressor (or condenser) of the cooler unit. The outer diameter of the collar part 20 is greater than that of the major part 21.

As will become apparent as the description proceeds, the sealing collar part 20 is adapted to be placed within an opening 12 formed in the dash panel 11 of the associated motor vehicle. That is, upon assembly, the sealing collar part 20 is sealingly held by a labyrinth seal 14 of a grommet 13 which is tightly held within the opening 12 of the dash panel 11.

As is shown in FIG. 1, the coupler 22 is formed within the sealing collar part 20 with an enlarged space 26' which serves as a silencer. In order to achieve a satisfying silencing function, the enlarged space 26' should have a sectional diameter sufficiently larger than that of the pipe 5. It is to be noted that provision of such an enlarged space 26' in the coupler 22 means a reduced thickness of the wall portion of the sealing collar part 20 and thus brings about an economical structure of the coupler 22.

As is best seen in FIG. 1, an annular end bracket 28 is tightly and sealing disposed between the rear end of the sealing collar part 20 of the coupler 22 and the outward end portion of the pipe 5. For this arrangement of the bracket 28, brazing, caulking or the like is employed.

As shown in FIG. 1, an outward end 5' of the pipe 5 is somewhat projected into the enlarged space 26' of the coupler 22. If desired, an annular projection 30 may be provided at an inward end of the enlarged space 26'. With these projections 5' and 30, the silencing effect of the coupler 22 is increased. However, these projections 5' and 30 may be omitted if the enlarged space 26' can exhibit a satisfied silencing effect without them.

In the following, advantages of the present invention will be described.

First, because the troublesome reaming work is not necessary in assembling the coupler 22 with the pipe 5, the manufacturing efficiency of the vehicle-mounted air conditioner is increased.

Second, because the coupler 22 of the invention is a monobloc member consisting of a coupler proper part 21 and a collar proper part 20 unlike the case of the afore-mentioned conventional one, assembly of the coupler 22 to the pipe 5 is easily achieved.

Third, because the coupler 22 is constructed to have therein the enlarged space 26' which serves as the silencer, the noise caused by the flow of the coolant is eliminated or at least minimized.

Fourth, due to provision of the enlarged space 26' in the coupler 22, the wall thickness of the coupler 22 is reduced thereby reducing the cost of the same.

While, we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

What is claimed is:

1. A coupler constructed of metal, comprising:
    a cylindrical major part having a first cylindrical bore formed therethrough, said cylindrical major part being formed about its cylindrical outer surface with an externally threaded portion and a polygonal enlarged head;
    a collar part having a second cylindrical bore formed therethrough, said second cylindrical bore being greater in diameter than said first cylindrical bore; and
    silencing means for permitting said second cylindrical bore to serve as a silencer, said silencing means including an annular bracket tightly and sealingly disposed in a rear end of said second cylindrical bore of the collar part, and a first annular projection coaxially projected into said second cylindrical bore from a center opening of said annular bracket leaving an annular space between the first annular projection and the rear end of said second cylindrical bore;
    wherein said cylindrical major part and said collar part are coaxially arranged and integrated with each other to constitute a monobloc cylindrical structure.

2. A coupler as claimed in claim 1, in which the integration of said cylindrical major part and said collar part is so made as to have said polygonal enlarged head positioned between said externally threaded portion and said collar part.

3. A coupler as claimed in claim 2, in which said silencing means further comprises a second annular projection coaxially projected into said second cylindrical bore from the other axial end of the bore.

4. A coupler as claimed in claim 1, in which said monobloc cylindrical structure is constructed of a forged aluminium.

5. In a motor vehicle having a cooler unit and a dash panel,
an arrangement comprising:
means defining an opening in said dash panel;
at least one pipe extending from said cooler unit to said opening;
a grommet detachably connected to said opening;
a coupler constructed of metal, comprising:
  a cylindrical major part having a first cylindrical bore formed therethrough, said cylindrical major part being formed about its cylindrical outer surface with an externally threaded portion and a polygonal enlarged head;
  a collar part having a second cylindrical bore formed therethrough, said second cylindrical bore being greater in diameter than said first cylindrical bore;
  silencing means for permitting said second cylindrical bore to serve as a silencer;
  wherein said cylindrical major part said collar part are coaxially arranged and integrated with each other to constitute a monobloc cylindrical structure,
  and wherein said coupler is sealingly held by said grommet; and
connecting means for connecting a leading end of said pipe with a rear end of said collar part of said coupler.

6. An arrangement as claimed in claim 5, in which said connecting means comprises an annular end bracket which is tightly and sealingly disposed between the rear end of said collar part and the leading end of said pipe.

7. An arrangement as claimed in claim 6, in which said silencing means comprises the leading end of said pipe which is projected coaxially into said second cylindrical bore.

8. An arrangement as claimed in claim 7, in which said silencing means further comprises an annular projection which is coaxially projected into said second cylindrical bore from an inward end of said bore.

9. An arrangement as claimed in claim 8, in which said grommet is formed with a labyrinth seal which contacts the outer cylindrical surface of said collar part of said coupler to achieve a watertight sealing therebetween.

10. In a motor vehicle having a cooler unit and a dash panel, an arrangement comprising:
means defining an opening in said dash panel;
at least one pipe extending from said cooler unit to said opening;
a grommet detachably connected to said opening;
a coupler constructed of metal, comprising:
  a cylindrical major part having a first cylindrical bore formed therethrough, said cylindrical major part being formed about its cylindrical outer surface with an externally threaded portion and a polygonal enlarged head;
  a collar part having a second cylindrical bore formed therethrough, said second cylindrical bore being greater in diameter than said first cylindrical bore; and
silencing means for permitting said second cylindrical bore to serve as a silencer, said silencing means including an annular bracket tightly and sealingly disposed in a rear end of said second cylindrical bore of the collar part, and a first annular projection coaxially projected into said second cylindrical bore from a center opening of said annular bracket leaving an annular space between the first annular projection and the rear end of said second cylindrical bore;
wherein said cylindrical major part and said collar part are coaxially arranged and integrated with each other to constitute a monobloc cylindrical structure; and
wherein said coupler is sealingly held by said grommet.

11. An arrangement as claimed in claim 10, in which said grommet is formed with a labyrinth seal which contacts the outer cylindrical surface of said collar part of said coupler to achieve a watertight sealing therebetween.

12. An arrangement as claimed in claim 10, wherein an inner cylindrical surface of said major cylindrical part is parallel to an outer surface of said first annular projection from said annular bracket to the termination of said first annular projection in said second cylindrical bore.

* * * * *